(No Model.) 3 Sheets—Sheet 1.

J. W. HYATT.
FILTER STRAINER.

No. 512,299. Patented Jan. 9, 1894.

Attest:
Edw. G. Kinsey
W. Batson

Inventor.
John W. Hyatt, per
Crane & Miller, Attys.

(No Model.) 3 Sheets—Sheet 2.

J. W. HYATT.
FILTER STRAINER.

No. 512,299. Patented Jan. 9, 1894.

Attest:
Edw. F. Kinsey
W. Batson

Inventor.
John W. Hyatt, per
Crane & Miller, Attys

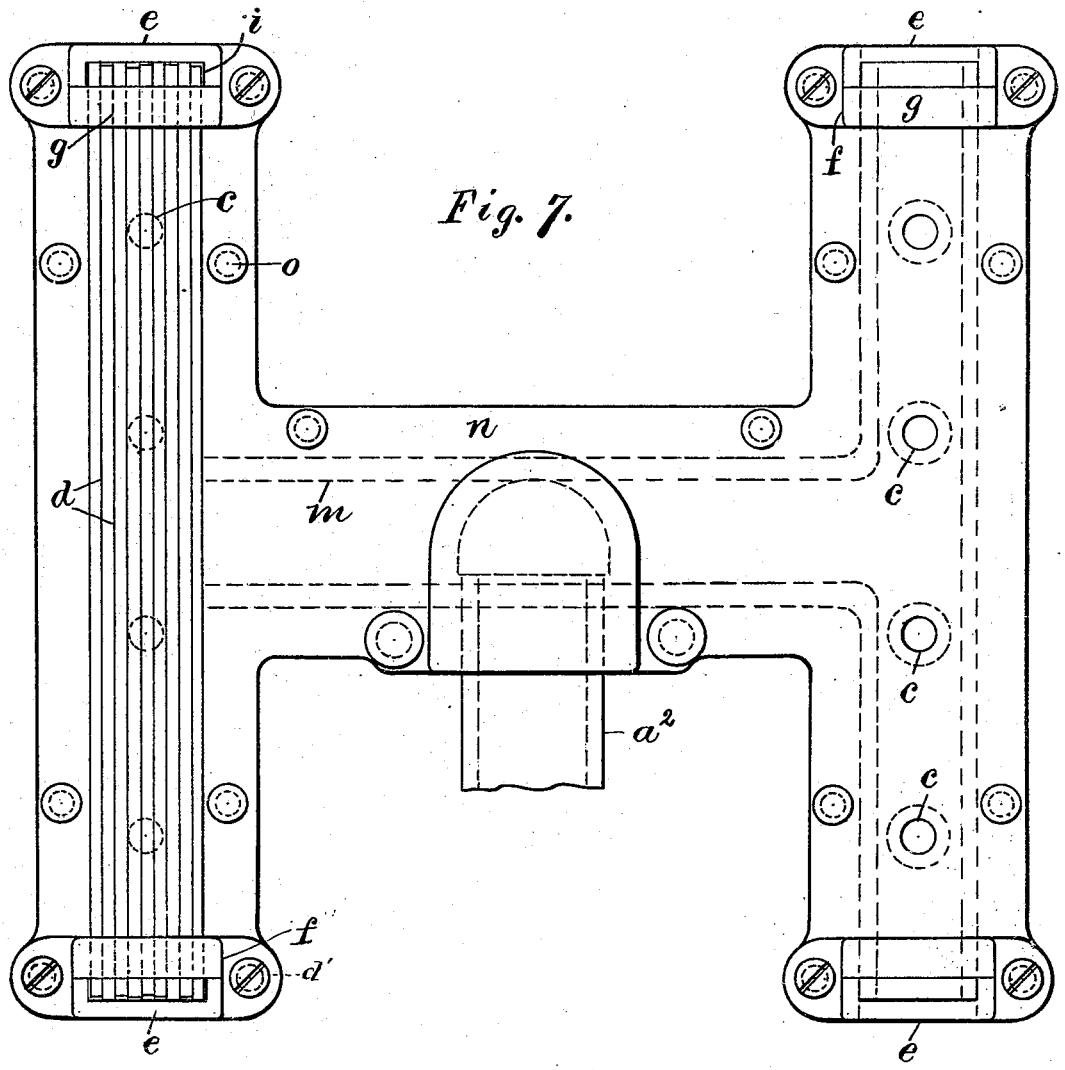

UNITED STATES PATENT OFFICE.

JOHN W. HYATT, OF NEWARK, NEW JERSEY.

FILTER-STRAINER.

SPECIFICATION forming part of Letters Patent No. 512,299, dated January 9, 1894.

Application filed July 29, 1893. Serial No. 481,807. (No model.)

*To all whom it may concern:*

Be it known that I, JOHN W. HYATT, a citizen of the United States, residing at Newark, Essex county, New Jersey, have invented certain new and useful Improvements in Filter-Strainers, fully described and represented in the following specification and the accompanying drawings, forming a part of the same.

This invention consists in an improved straining device adapted to prevent the penetration of sand to the outlet pipes from granular filter beds.

The outlet passages from the filter beds are in the present invention provided with a suitable cover upon which the granular filter bed directly rests. Such cover is perforated or slotted to permit the egress and ingress of water, and a series of loose rods is arranged within suitable guides so as to rest directly upon the cover over such apertures. The guides are constructed to hold the rods laterally and longitudinally, but to permit them to lift freely from the cover when the water is reversed through the passages for disintegrating and washing the filter bed. When the pressure of such water current ceases, the rods fall immediately over the apertures and thereafter protect the outlet passages from the access of sand, while they permit the filtered water to pass freely to the passage. The water passage may be formed by the use of a cylindrical pipe, in which case the upper side of the pipe forms the cover and is provided with holes or slots for the outlet apertures. The passage may also be formed in a casting provided with a detachable cover, and both constructions are shown in the annexed drawings.

Figure 1:
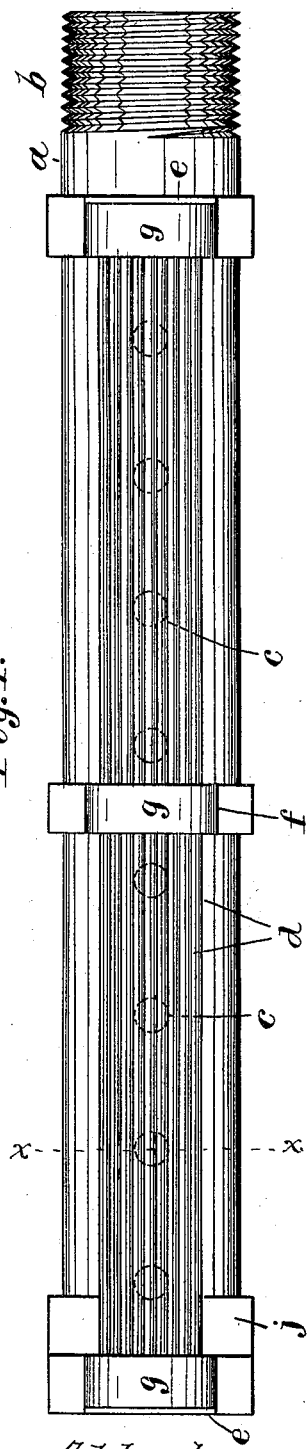
Figure 2:
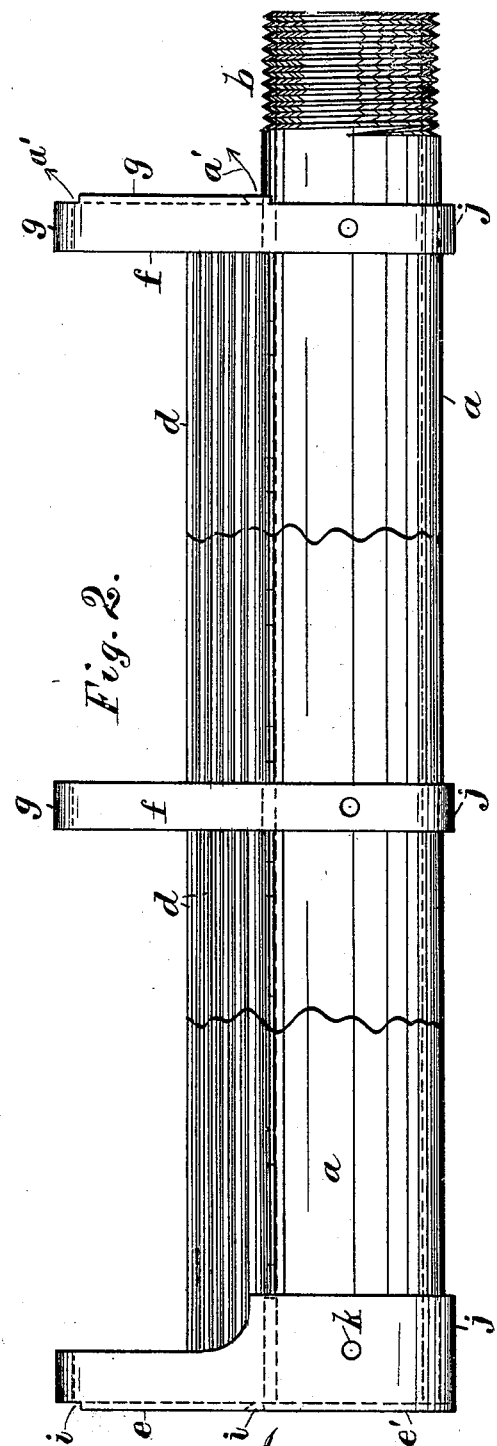
Figure 3:
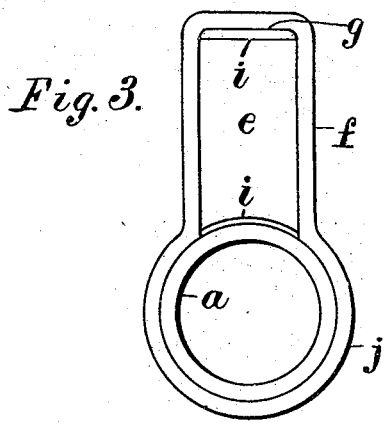
Figure 4:
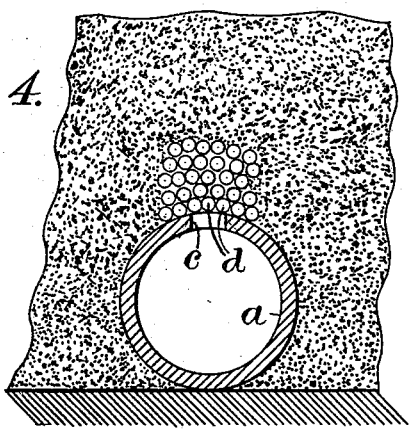
Figure 5:
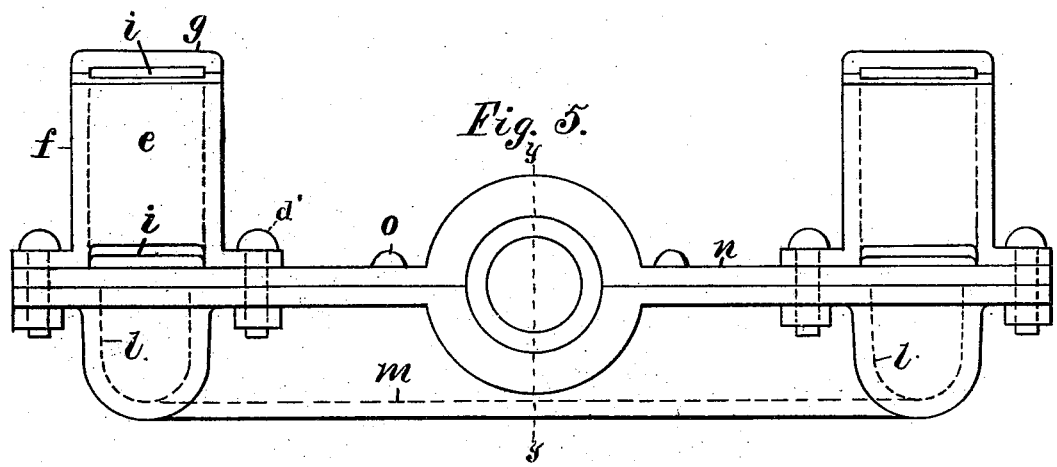
Figure 6:
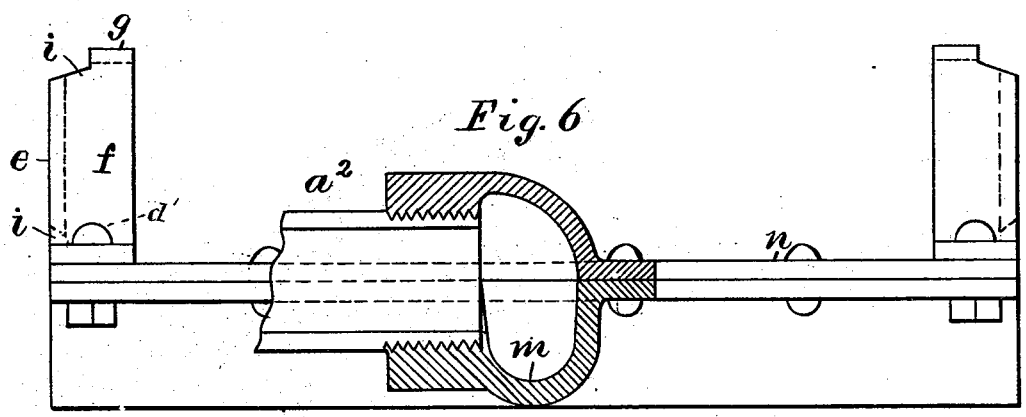

Figure 1 is a plan of a pipe provided with my improved strainer. Fig. 2 is a side elevation of the same. Fig. 3 is an elevation of the guide. Fig. 4 is a cross section of the pipe on line $x$, $x$, in Fig. 1 with the sand adjacent to the same. Fig. 5 is an end elevation of a duplex strainer. Fig. 6 is a cross section of the same on line $y$, $y$, in Fig. 5, and Fig. 7 is a plan of the same.

The pipe $a$ in Figs. 1, 2 and 3, represents one of the outlets from a granular filter bed, and would be suitably supported in the bottom of the filter bed and connected by its thread $b$ with a suitable pipe to discharge the water from the bed. The granular material of the filter bed would surround the pipe and its attachments, as shown in Fig. 4. Apertures $c$ are shown in the top of the pipe, and a quantity of straight wire rods $d$ are shown resting upon the top of the pipe over such apertures with their ends embraced loosely in guides which are formed with end walls $e$, side walls $f$, and a top piece $g$ which is arranged at a suitable distance above the rods to permit their upward movement to the required extent.

In the normal operation of the filter the water is introduced above the granular material and percolates through the same to the strainer, where it makes its exit through the minute interstices between the rods to the apertures $c$, and is then discharged from the filter by the water connections of the pipe $a$. When the granular material becomes foul and it is necessary to cleanse the filter bed, the current of water is reversed in the pipe $a$ and the water is dischaged through the apertures $c$ which operates first to lift the rods $d$ and then to penetrate the material of the bed and disintegrate the same as required.

The top pieces $g$ of the guides prevent the rods from being forced out of the same, while they permit them to lift sufficiently to diffuse the water in every direction.

To permit the diffusion of the washing water beyond the ends of the strainer, openings $i$ are formed in the outer walls $e$ of the guides adjacent to the top of the guide and the pipe $a$. Such openings permit the water to escape in the direction of the arrows $a'$, while the water is also discharged laterally beneath the rods and upward through the same, thus disintegrating and cleansing the bed upon every side of the strainer. A central guide with side pieces $f$ and top piece $g$ is shown applied to the rods in Figs. 1 and 2, intermediate to the end guides, and would be used where the rods are made so long as to require a support between their ends.

The pipe and rods are shown broken upon the drawings to indicate that they would be made of greater length than is shown in order to require such a central guide.

The end of the pipe opposite the thread $b$ is shown closed by a cap $e'$ continuous with the outer wall $e$ of the guide, and each of the guides is provided with a circular socket $j$ which is secured removably upon the pipe by a transverse pin $k$. The rods are made of straightened brass wire about one tenth of an inch diameter, as shown in the drawings, and furnishes a free exit for the water to the water passage beneath, while it wholly prevents the access of sand to such passage. The strainers made of pipes may be projected in any direction beneath the filter bed, by suitable connections.

A duplex strainer formed of cast iron is shown in Figs. 5, 6 and 7, which furnishes in a single fixture the means of disintegrating and draining a certain portion of a filter bed. In this construction two lateral troughs or passages $l$ are connected by a transverse trough $m$, all formed in the bottom casting and inclosed upon the top by a cover $n$ which is secured thereon by rivets $o$. A threaded pipe socket is formed in the transverse passage, and a pipe $a^2$ is shown connected therewith to deliver the filtered fluid and to supply the washing fluid to the strainer. The guides are shown at the ends of the lateral passages secured by screws $d'$ to the cover $n$, and the rods $d$ are shown in place over one of the passages and removed over the other to clearly show the holes $c$.

Other constructions may be devised to practice my invention, as claimed in my application, Serial No. 463,311, filed February 23, 1893, in which slots are shown instead of the holes $e$, and the rods are wholly inclosed in a casing with perforated top. The rods perform the function of a strainer only when the water is moving downward through the filter bed, and discharging from the water passage beneath the rods, and my claims herein are therefore in relation to an outlet passage having a cover with outlet apertures therein. It is understood, however, that the water passage forms a water inlet during the washing of the filter bed, and that the apertures are then inlet apertures; and that the function of the rods as strainers is suspended during such operation. During the washing operation, the rods serve to diffuse the entering current of water throughout the substance of the filter bed, and thus enable it to disintegrate the granular material in the most thorough manner.

Having thus set forth the nature of my invention, what I claim herein is—

1. In a filter strainer, the combination, with an outlet passage having a cover with outlet apertures, of a series of loose rods resting upon the cover over such apertures, as herein set forth.

2. In a filter strainer, the combination, with an outlet passage having a cover with outlet apertures, of a series of loose rods resting upon the cover over such apertures, and transverse guides to hold the rods movably in place, as set forth.

3. In a filter strainer, the combination, with an outlet passage having a cover with outlet apertures, of a series of loose rods resting upon the cover over such apertures, guides holding the rods longitudinally and laterally at the ends, and an arch over the guides intermediate to the ends, as herein set forth.

4. In a filter strainer, the combination, with an outlet passage having a cover with outlet apertures, of a series of loose rods resting upon the cover over such apertures, guides holding the rods longitudinally and laterally at the ends, and provided with a water outlet adjacent to the cover, as herein set forth.

5. In a filter strainer, the combination, with a cylindrical pipe having a series of apertures in the top, of a series of loose rods resting upon the pipe over such apertures, and guides adapted to embrace the pipe and to hold the rods movably in place, substantially as set forth.

6. In a filter strainer, the combination, with a cylindrical pipe plugged at one end, and having a series of apertures in the top, of a series of loose rods resting upon the pipe over such apertures, guides adapted to embrace the pipe and to hold the rods laterally and longitudinally, and each guide having a water outlet adjacent to the top of the pipe, as set forth.

In testimony whereof I have hereunto set my hand in the presence of two subscribing witnesses.

JOHN W. HYATT.

Witnesses:
HARRY L. SODEN,
THOMAS S. CRANE.